United States Patent [19]
Kneezel et al.

[11] Patent Number: 5,745,131
[45] Date of Patent: Apr. 28, 1998

[54] GRAY SCALE INK JET PRINTER

[75] Inventors: Gary A. Kneezel, Webster; William R. Burger, Fairport; Steven J. Harrington, Holley; Dale R. Ims, Webster; Joseph F. Stephany, Williamson, all of N.Y.

[73] Assignee: Xerox Corporation, Stamford, Conn.

[21] Appl. No.: 510,936

[22] Filed: Aug. 3, 1995

[51] Int. Cl.⁶ ..................................................... B41J 2/205
[52] U.S. Cl. ........................................... 347/15; 347/40
[58] Field of Search ................................ 347/12, 13, 15, 347/40, 41, 42

[56] References Cited

U.S. PATENT DOCUMENTS

| | | | |
|---|---|---|---|
| 4,746,935 | 5/1988 | Allen | 346/140 |
| 4,829,324 | 5/1989 | Drake et al. | 346/140 R |
| 4,963,882 | 10/1990 | Hickman | 346/1.1 |
| 4,982,199 | 1/1991 | Dunn | 346/1.1 |
| 5,124,716 | 6/1992 | Roy et al. | 346/1.1 |
| 5,208,605 | 5/1993 | Drake | 346/1.1 |
| 5,349,375 | 9/1994 | Bolash et al. | 347/40 |
| 5,412,410 | 5/1995 | Rezanka | 347/15 |
| 5,455,610 | 10/1995 | Harrington | 347/43 |
| 5,469,198 | 11/1995 | Kadonaga | 347/41 |
| 5,488,396 | 1/1996 | Burke et al. | 347/37 |
| 5,574,832 | 11/1996 | Towery et al. | 395/109 |
| 5,598,191 | 1/1997 | Kneezel | 347/40 |
| 5,604,519 | 2/1997 | Keefe et al. | 347/13 |

Primary Examiner—David M. Gray
Assistant Examiner—John Chizmar
Attorney, Agent, or Firm—Daniel J. Krieger

[57] ABSTRACT

A printing machine of the type in which liquid ink is deposited on a recording medium for printing gray scale images. The printing machine includes a printhead having ink ejecting nozzles of different sizes. Nozzles of the same size are arranged in groups and groups of nozzles are offset from one another. Ink drops of one group are deposited at locations corresponding to the points of a grid and ink drops of another group are deposited at locations corresponding to points not on the grid. Gray scale printing is achieved by the variation in drop size produced by different groups of nozzles as well as offsetting nozzles of one or more groups of nozzles from a reference group of nozzles printing on the points of a grid.

8 Claims, 11 Drawing Sheets

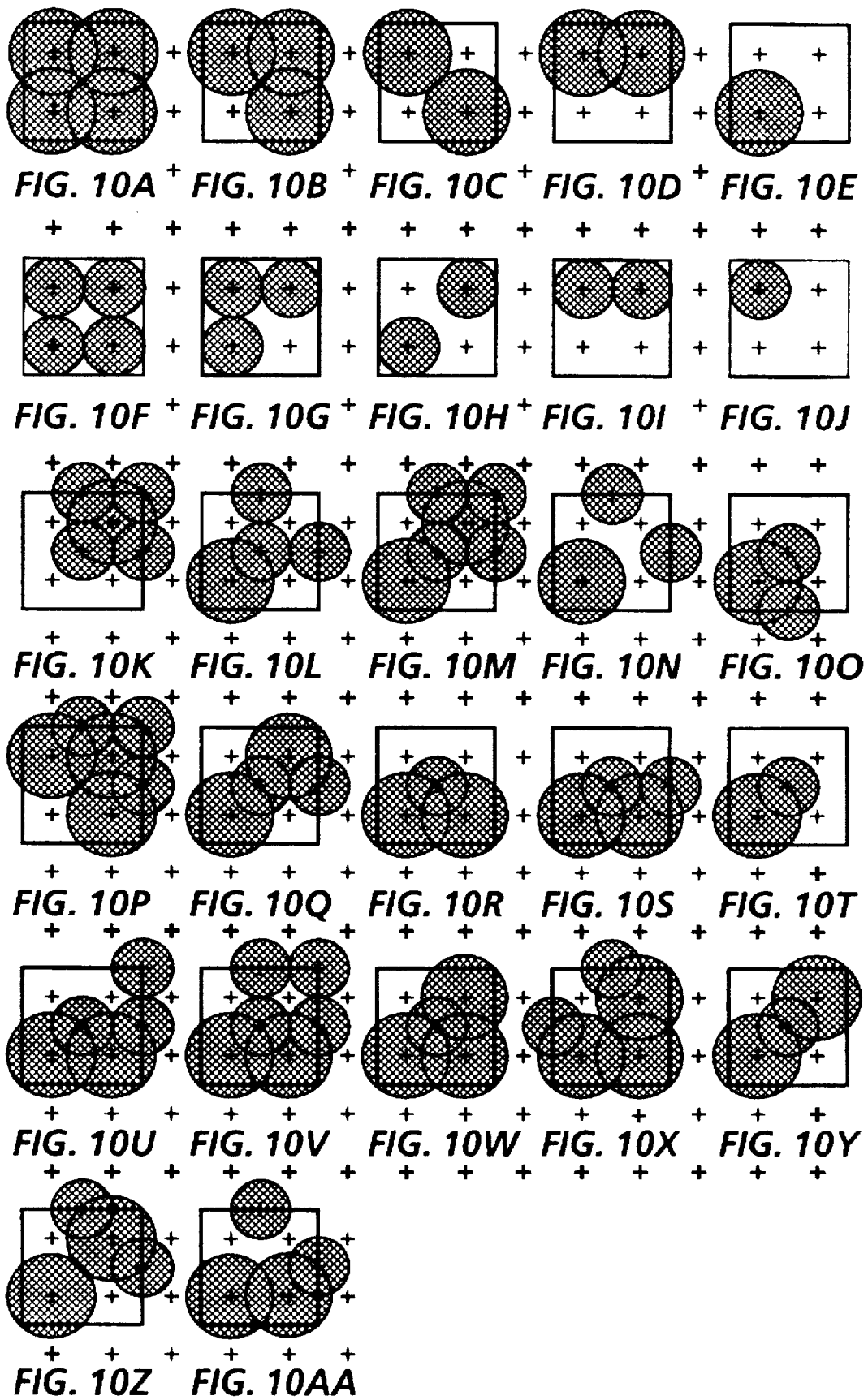

GRAY SCALE INK JET PRINTER

FIELD OF INVENTION

The present invention relates generally to a liquid ink printing apparatus and a method for gray scale printing, and more particularly to an ink-jet printer for gray scale printing which uses an ink jet printhead having offset groups of nozzles capable of printing different size spots.

BACKGROUND OF THE INVENTION

Liquid ink printers of the type frequently referred to as continuous stream or as drop-on-demand, such as piezoelectric, acoustic, phase change wax-based or thermal, have at least one printhead from which droplets of ink are directed towards a recording sheet. Within the printhead, the ink is contained in a plurality of channels. Power pulses cause the droplets of ink to be expelled as required from orifices or nozzles at the end of the channels.

In a thermal ink-jet printer, the power pulse is usually produced by a heater transducer or a resistor, typically associated with one of the channels. Each resistor is individually addressable to heat and vaporize ink in the channels. As voltage is applied across a selected resistor, a vapor bubble grows in the associated channel and initially bulges from the channel orifice followed by collapse of the bubble. The ink within the channel then retracts and separates from the bulging ink thereby forming a droplet moving in a direction away from the channel orifice and towards the recording medium whereupon hitting the recording medium a dot or spot of ink is deposited. The channel is then refilled by capillary action, which, in turn, draws ink from a supply container of liquid ink.

The ink jet printhead may be incorporated into either a carriage type printer, a partial width array type printer, or a page-width type printer. The carriage type printer typically has a relatively small printhead containing the ink channels and nozzles. The printhead can be sealingly attached to a disposable ink supply cartridge and the combined printhead and cartridge assembly is attached to a carriage which is reciprocated to print one swath of information (equal to the length of a column of nozzles), at a time, on a stationary recording medium, such as paper or a transparency. After the swath is printed, the paper is stepped a distance equal to the height of the printed swath or a portion thereof, so that the next printed swath is contiguous or overlapping therewith. This procedure is repeated until the entire page is printed. In contrast, the page width printer includes a stationary printhead having a length sufficient to print across the width or length of a sheet of recording medium at a time. The recording medium is continually moved past the page width printhead in a direction substantially normal to the printhead length and at a constant or varying speed during the printing process. A page width ink-jet printer is described, for instance, in U.S. Pat. No. 5,192,959.

Printers typically print information received from an image output device such as a personal computer. Typically, this received information is in the form of a raster scan image such as a full page bitmap or in the form of an image written in a page description language. The raster scan image includes a series of scan lines consisting of bits representing pixel information in which each scan line contains information sufficient to print a single line of information across a page in a linear fashion. Printers can print bitmap information as received or can print an image written in the page description language once converted to a bitmap consisting of pixel information.

A majority of thermal ink jet printers produce spots or drops of ink which are all of the same diameter within approximately about 10 percent and are therefore not capable of gray scale printing. Drop volume or spot size is determined by many factors, including the heater transducer area, the cross sectional area of the ink ejecting channel or nozzle, the pulsing conditions necessary to create an ink droplet, and the physical properties of the ink itself, such as the ink temperature. Although spot diameter changes of approximately ±10 percent are possible by changing pulsing conditions or ink temperature during printing, the given spot size is nominally constant to the extent that deliberate spot size variations cannot span a large enough range to be useful in gray scale printing.

Various methods and apparatus for gray scale printing with thermal ink jet printers and other ink jet printers include changing the ink drop size by either varying the driving signals to the transducer which generates the ink droplet or by creating a printhead which has a number of different sized ink ejecting orifices for creating gray scale images. The following references describe these and other methods and apparatus for liquid ink printing and more particularly to the printing of gray scale images with liquid ink printers.

In U.S. Pat. No. 4,982,199 to Dunn, a method and apparatus for gray scale printing with a thermal ink jet pen is described. The firing resistor in the thermal ink jet pen is driven by two signals in sequence. A first signal is used as a warming signal for the ink which is followed by a second signal used as a firing pulse to thereby eject a bubble of ink from the nozzle. By varying the degree of prewarming, the droplets ejected by the firing pulse can be varied in volume, thereby effecting gray scale printing.

U.S. Pat. No. 4,746,935 to Allen, describes a multi-tone ink jet printer and a method of operation. An eight level half-tone thermal ink jet printer prints with droplets of ink having droplet volumes weighted in a binary sequence. Three binary weighted drop generators are fired in sequence for use in an eight-level, four color printing process. The printhead employs a three drop generator scheme wherein a plurality of orifices eject different ink volumes.

U.S. Pat. No. 5,208,605 to Drake, describes a printhead for a thermal ink jet printer which includes at least two arrays of linearly spaced apart nozzles such that each array has a different resolution to produce printed pages at a draft print using a low resolution array, at a letter quality print using a high resolution array or a combination of both arrays to provide enhanced gray scale reproduction.

U.S. Pat. No. 5,124,716 to Roy et al., describes a method and apparatus for printing with ink drops of varying sizes using a drop on demand ink jet printhead. The drop-on-demand ink jet printhead has an ink chamber coupled to a source of ink and an ink drop orifice with an outlet. An acoustic driver produces a pressure wave in the ink and causes the ink to pass outwardly through the ink drop orifice and outlet. The size of the ink drops may be varied such as by driving the acoustic driver with varying drive signals.

U.S. Pat. No. 5,412,410 to Rezanka, describes a thermal ink jet printhead having at least two different groups of different size nozzles from which ink droplets of different ink volumes are selectively ejected.

SUMMARY OF THE INVENTION

According to one aspect of the present invention, there is provided a printing machine of the type in which liquid ink is deposited on a recording medium. The printing machine includes a printhead having a first linear array of ejectors for depositing ink spots of a first size on the recording medium and a second linear array of ejectors depositing ink spots of a second size on the recording medium. The second linear array is offset an offset distance from the first linear array in the linear direction. Also included is a means for moving the printhead in a direction transverse to the first linear array.

According to another aspect of the present invention, there is provided a liquid ink printhead. The liquid ink printhead includes a first linear array of first liquid ink ejectors producing ink spots of a first size, and a second linear array of second liquid ink ejectors producing ink spots of a second size, different than the first size, wherein the second linear array is offset in a linear direction an offset distance from the first linear array.

BRIEF DESCRIPTION OF THE DRAWINGS

FIGS. 10A through 10AA illustrates a plurality of patterns each representing a different gray level produced by different combinations of offset spots of two different sizes.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
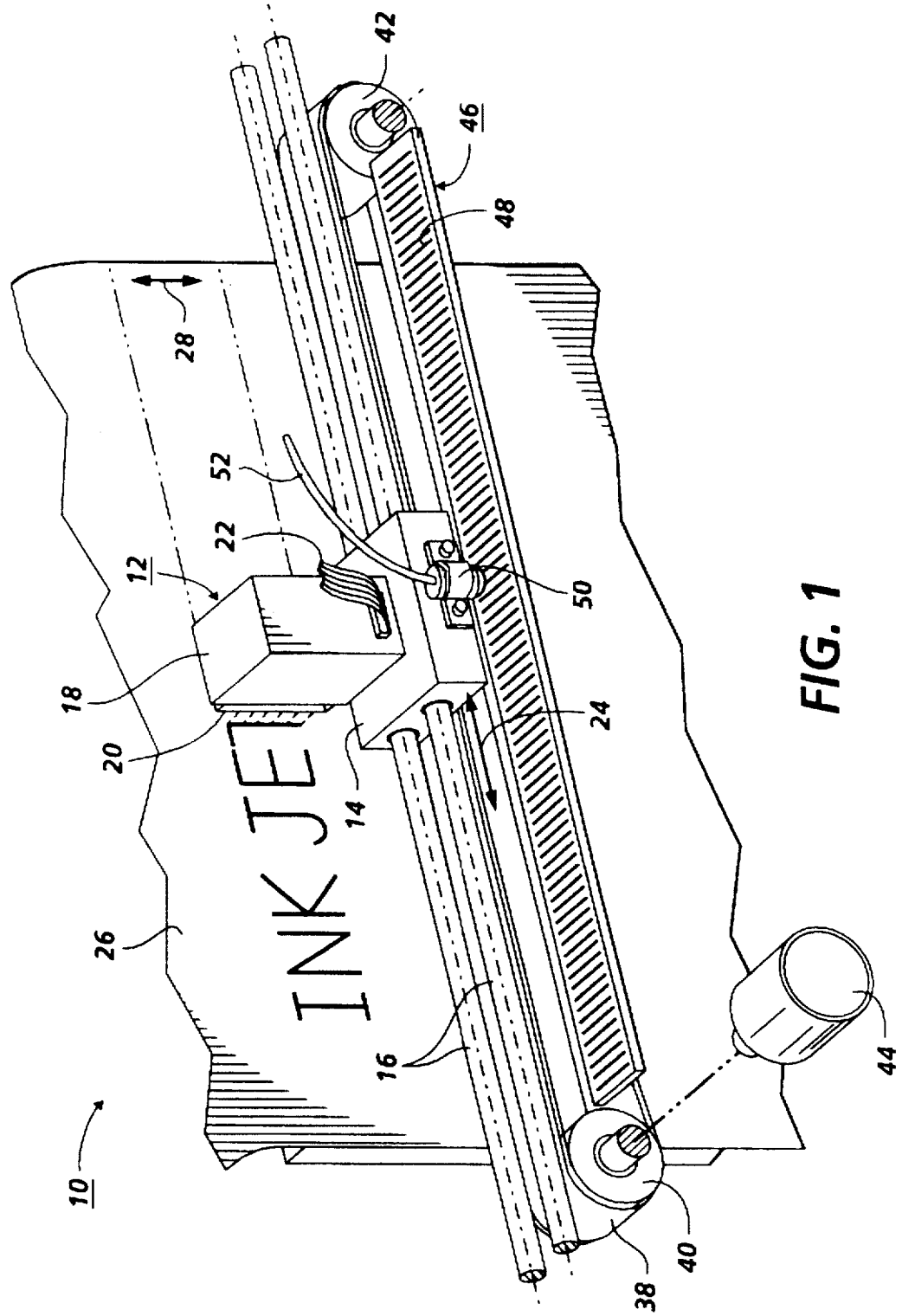
FIG. 1. is a partial schematic perspective view of an ink jet printer incorporating the present invention.

FIG. 1 illustrates a partial schematic perspective view of an ink jet printer 10 having an ink jet printhead cartridge 12 mounted on a carriage 14 supported by carriage rails 16. The printhead cartridge 12 includes a housing 18 containing ink for supply to a thermal ink jet printhead 20 which selectively expels droplets of ink under control of electrical signals received from a controller of the printer 10 through an electrical cable 22. The printhead 20 contains a plurality of ink channels (not shown) which carry ink from the housing 18 to respective ink ejectors, such as orifices or nozzles (also not shown). When printing, the carriage 14 reciprocates or scans back and forth along the carriage rails 16 in the directions of the arrow 24. As the printhead cartridge 12 reciprocates back and forth across a recording medium 26, such as a sheet of paper or transparency, droplets of ink are expelled from selected ones of the printhead nozzles towards the sheet of paper 26. The ink ejecting orifices or nozzles are typically arranged in a linear array perpendicular to the scanning direction 24. During each pass of the carriage 14, the recording medium 26 is held in a stationary position. At the end of each pass, however, the recording medium is stepped by a stepping mechanism under control of the printer controller in the direction of an arrow 28. For a more detailed explanation of the printhead and printing thereby, refer to U.S. Pat. No. 4,571,599 and U.S. Pat. No. Reissue 32,572, the relevant portions of which are incorporated herein by reference.

The carriage 14 is moved back and forth in the scanning directions 24 by a belt 38 attached thereto. The belt 38 is driven by a first rotatable pulley 40 and a second rotatable pulley 42. The first rotatable pulley 40 is, in turn, driven by a reversible motor 44 under control of the controller of the ink jet printer in addition to the toothed belt/pulley system for causing the carriage to move, it is also possible to control the motion of the carriage by using a cable/capstan, lead screw or other mechanisms as known by those skilled in the art.

To control the movement and/or position of the carriage 14 along the carriage rails 16, the printer includes an encoder having an encoder strip 46 which includes a series of fiducial marks in a pattern 48. The pattern 48 is sensed by a sensor 50, such as a photodiode/light source attached to the printhead carriage 14. The sensor 50 includes a cable 52 which transmits electrical signals representing the sensed fiducial marks of the pattern 48 to the printer controller.

The ink jet printhead 20 includes one or more thermal ink jet printhead dies having an individual heater die and an individual channel die. The channel die includes an array of fluidic channels which bring ink into contact with resistive heaters which are correspondingly arranged on the heater die. In addition, the die may also have integrated addressing electronics and driver transistors. Fabrication yields of die assemblies at a resolution on the order of 300–600 channels per inch is such that the number of channels per die is preferably in the range of 50–500 under current technology capabilities. Since the array of channels in a single die assembly is not sufficient to cover the length of a page, the printhead is either scanned across the page with a paper advance between scans or multiple die assemblies are butted together to produce a page width printbar. Because thermal ink jet nozzles typically produce spots or dots of a single size, high quality printing requires the fluidic channels and corresponding heaters to be fabricated at a high resolution on the order of 400–600 channels per inch.

In an orientation dependent etching method of channel fabrication on silicon wafers, the channels are triangular shaped with a height equal to 0.707 times the channel width. For orientation dependent etching of silicon, a standard channel width for 300 spot per inch printing is approximately 66 microns. It has been shown that spot diameter versus channel width begins to level off for larger channel widths, but that an overall range in spot diameters of 2.4 to 1 is possible. Further ranges in spot size are possible by also changing the dimensions of the resistive heater which is pulsed to form the bubble which propels the ink.

Figure 2:
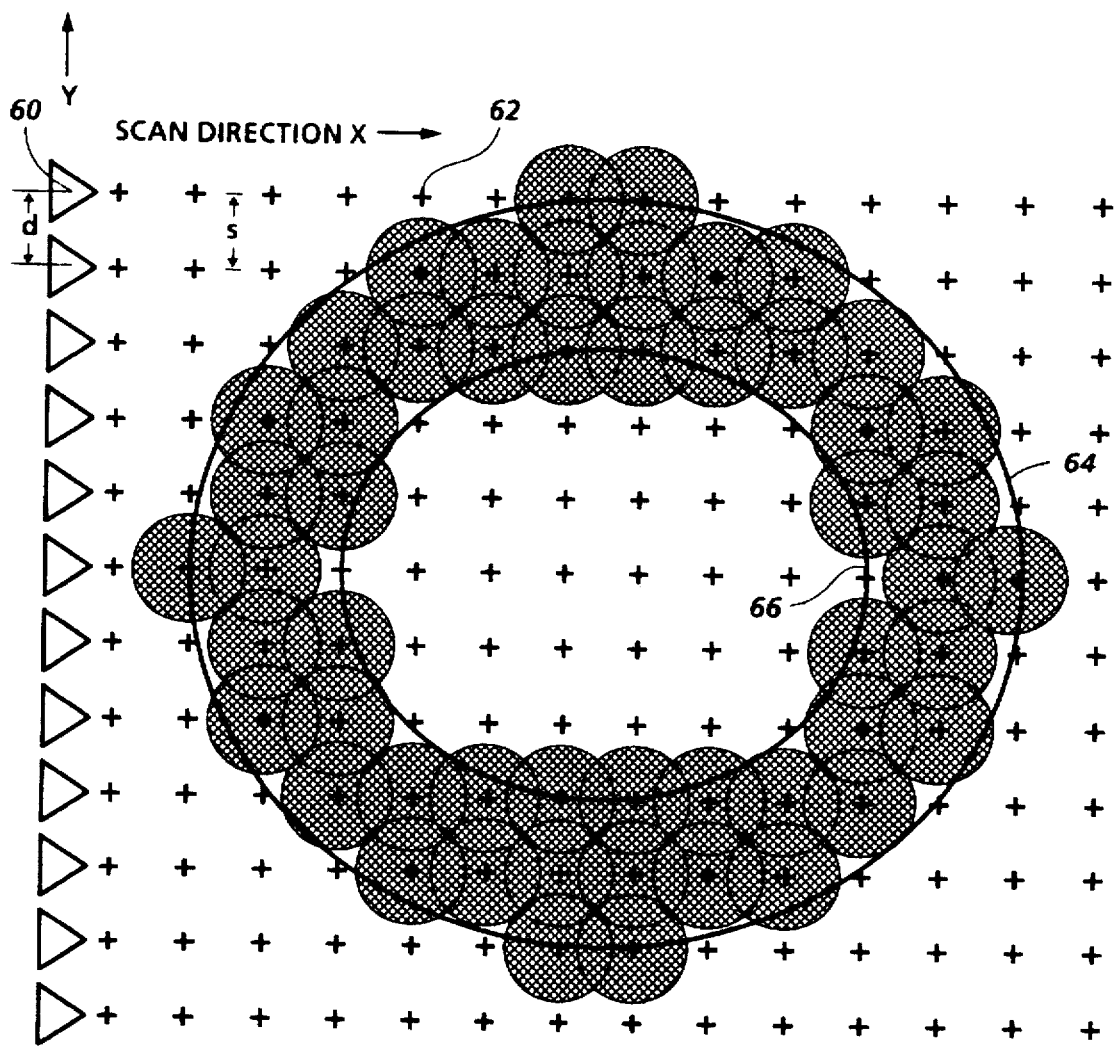
FIG. 2 illustrates the locations of ink drops in a test pattern deposited by a printhead having ink ejecting nozzles of the same size.

In a printer having a printhead with equally spaced nozzles, each of the same size producing ink spots of the same size, the pixels are placed on a square first grid having a size s where s is generally the spacing between the marking transducers or channels on the printhead as illustrated in a sample printing pattern of FIG. 2. The nozzles 60 (schematically represented as triangles) traverse across a recording medium in the scan direction x as illustrated. The nozzles which are spaced from one another a specified distance d, also known as the pitch, deposit ink spots or drops on pixel centers 62 on the grid having the grid spacing s in a direction perpendicular to the scanned direction x, which is of course dependent on the spacing d. Typically, the nozzles and printing conditions are designed to produce spot diameters of approximately 1.414 (the square root of 2) times the grid spacing s. This allows complete filling of space, by letting diagonally adjacent pixels touch. A disadvantage of this printing scheme is that jaggedness may be objectionable at line edges—particularly for lines or curves at small angles to the scan direction as here illustrated in FIG. 2. A first ellipse 64 located outside a second ellipse 66 in FIG. 2, indicate at what portions of the printed image the jaggedness would be most objectionable. In addition, print quality can be determined by: 1) how much white space remains within the ring defined by the first and second ellipses, 2) how far the spots extend outside either the first or second ellipse, and 3) the amount of ink deposited on the recording medium.

One method of improving the line edge quality is to extend the addressability of the carriage to thereby allow dot placement at intermediate positions in the grid in the scanned direction. It is also possible to improve line edge quality by increasing the resolution. This, however, increases the complexity and cost of fabrication and typically slows down printing because of the additional number of spots to be printed.

Figure 3:
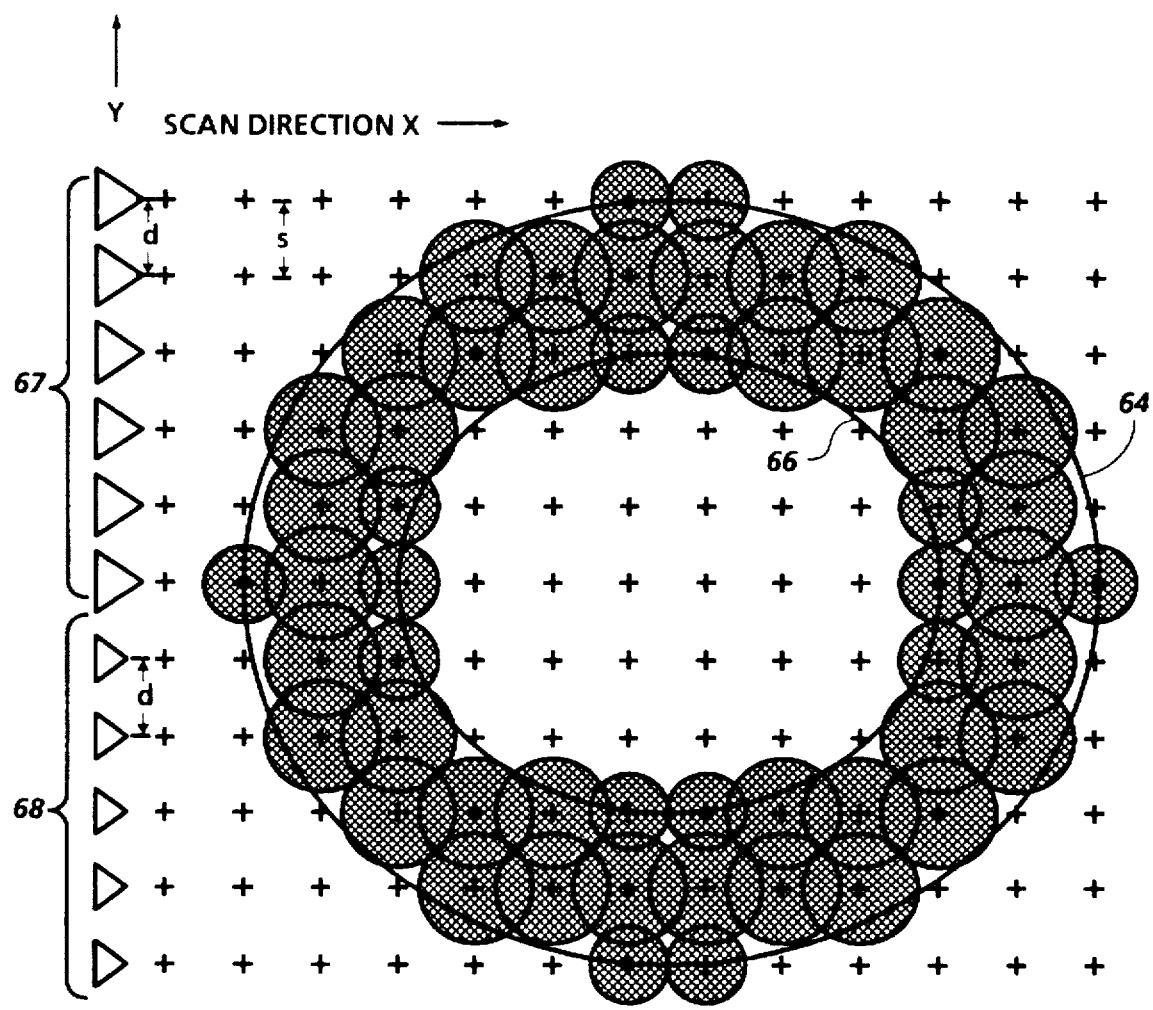
FIG. 3 illustrates the locations of ink drops in a test pattern deposited by a printhead having ink ejecting nozzles of a first size and a second size.

FIG. 3 illustrates printing of another pattern printed with a printhead having a first plurality of orifices 67 and a second plurality of orifices 68, producing spot diameters of 1.4s and 1.0s respectively. The spacing between nozzles of the first plurality of orifices 66 is again the distance d and the spacing between individual nozzles of the second plurality of orifices 68 is also the spacing d. The printing grid illustrated in FIG. 3 has a spacing of s between the pixel centers. The ink jet printer fires the individual nozzles of each plurality of orifices so that the ink drops land on the grid points in the scan direction. A somewhat better fill is achieved than previously illustrated in FIG. 2, at least in terms of the amount of ink used. Within the first ellipse 64 and the second ellipse 66, there are thirty-eight pixels of the larger ink drops and sixteen pixels of the smaller ink drops which yields a more extensive coverage of ink within the first ellipse 64 and the second ellipse 66, even though the total amount of ink used is actually less than in FIG. 2. Since the number of nozzles within each of the first plurality of nozzles 66 and the second plurality of nozzles 68 are equivalent, the paper is advanced half the printhead length to achieve proper fill. While the printheads and printing methods illustrated in FIG. 2 and in FIG. 3 provide for the printing of ink jet images having sufficient quality, especially when the resolution is increased upwards to 600 channels per inch, these printheads and methods, however, do not always provide images having the desired quality especially when considering gray scale levels, ink saving print modes, and printing throughput. Consequently, it is proposed to make printheads and printers capable of printing a range of spot diameters by modifying the printhead nozzle design and by extending the addressability of the printhead and printer by offsetting the respective groups of different size nozzles by spacing a first plurality of nozzles having a first nozzle size from a second plurality of nozzles having a second nozzle size but still having the same pitch within the first and second pluralities of nozzles. In addition to having offsetting groups of nozzles, the printer not only deposits the spots of ink on exact grid positions, but also deposits the spots of ink on intermediate grid positions in the scan direction.

Figure 4:
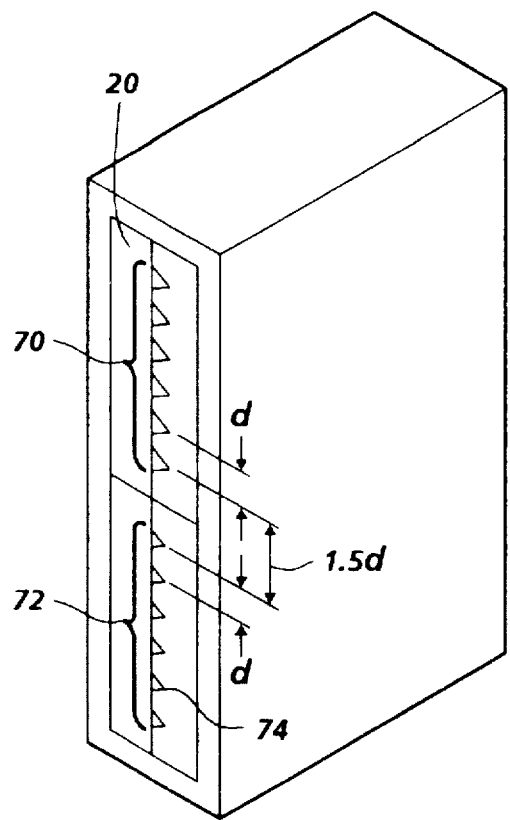
FIG. 4 illustrates an ink jet print cartridge having an ink jet printhead with ink ejecting nozzles of a first size offset from ink ejecting nozzles of a second size.

FIG. 4 illustrates a printhead cartridge 12 and printhead 20 of the present invention, including a first plurality of nozzles 70 of a first size having a pitch of d and a second plurality of nozzles 72 of a second size different from the first size also having a pitch of d. In addition, the first plurality of nozzles 70 is spaced from the second plurality of nozzles 72 by a distance equivalent to 1.5 times the distance or pitch d. Refer also to U.S. patent application entitled "Architecture For An Ink Jet Printer With Offset Arrays of Ejectors," assigned to Xerox Corporation, U.S. patent application Ser. No. 08/457,725, filed Jun. 1, 1995, herein incorporated by reference, which describes first and second linear arrays of ejectors wherein the ejectors are spaced by a predetermined pitch and the arrays are spaced from each other by an integral number of pitches plus a partial pitch.

Figure 5:
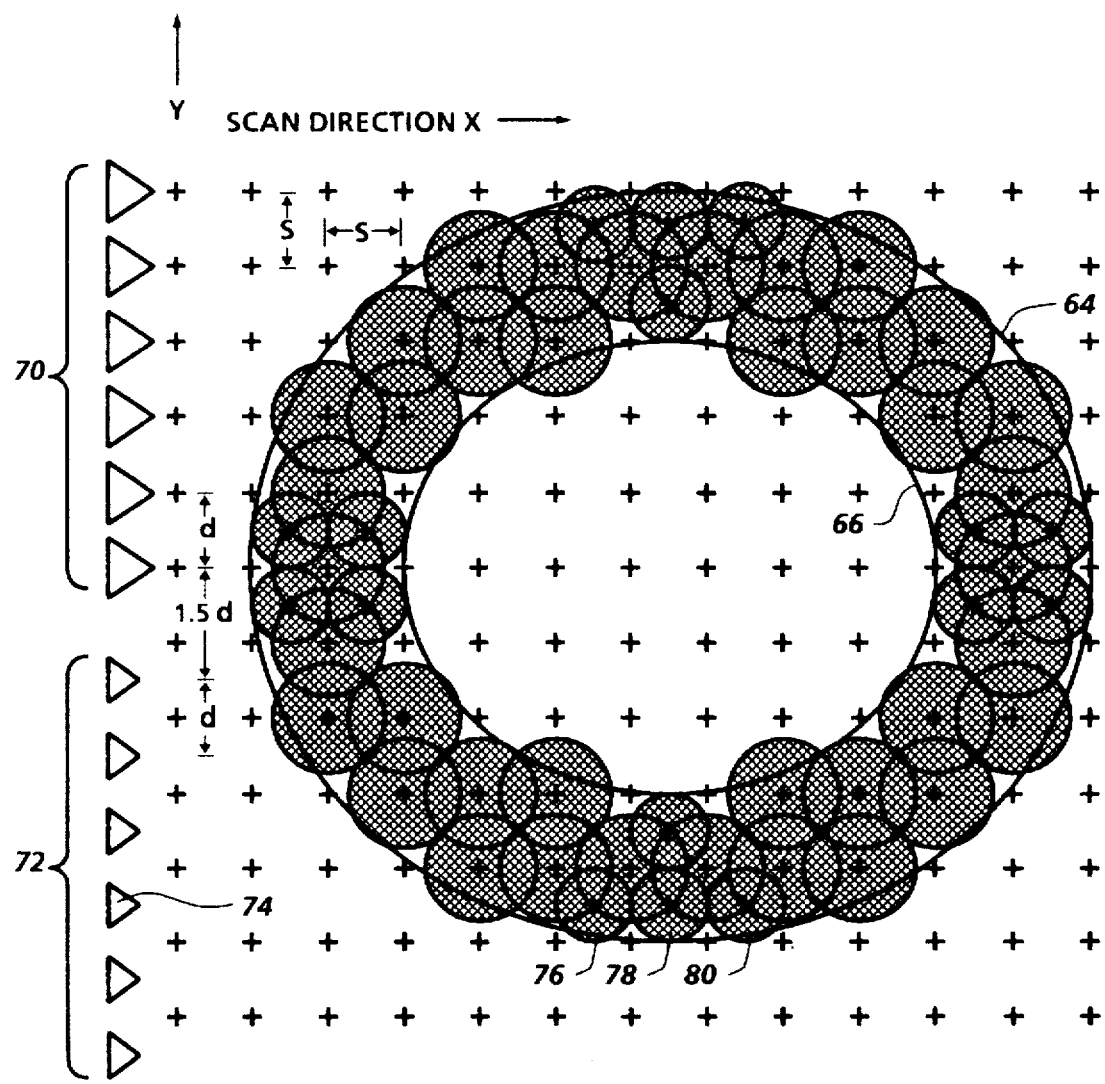
FIG. 5 illustrates the locations of ink drops in a test pattern deposited by the printhead of FIG. 4 such that the spot centers of the two sized spots are offset due to the nozzle group offset, and are also offset along the carriage scan direction.

FIG. 5 illustrates the improvement in printing over that illustrated in FIG. 3 using the printhead of FIG. 4. Since the second plurality of nozzles is offset 1.5 times d, the small drops are deposited at intermediate grid points or on a second grid offset from the first grid. For example, the smaller drops are deposited halfway between the grid points in the Y direction and are offset from the pixel centers 62 by one-halfs in the fast-scan direction as well. Offsetting in the scan direction is performed by the printer controller as is understood by one skilled in the art.

The same number of ink drops are deposited in FIG. 5 as were deposited in FIG. 3, so that the ink usage is the same, but the fit has a smoother appearance. For instance, a nozzle 74 of the second plurality of nozzles 72 deposits a first ink drop 76, a second ink drop 78 and a third ink drop 80 each of which is offset in the paper advance direction 5d, due to offsetting the first plurality of nozzles 70 from the second plurality of nozzles 72, as well as 0.5s in the scan direction x. When compared to FIG. 3, the ink drops 76, 78, and 80, provide a much better fill-in between the first ellipse 64 and the second ellipse 66. It should also be noted that the small ink drops are only deposited at intermediate grid points in the scan direction such that when the printhead scans across the sheet a second time, the additional fill provided by the smaller nozzles can be printed as quickly as were the nozzles of the first plurality 70. This enables faster rippling of the nozzles throughout the printhead and consequently a faster printing throughput. It is also possible, however, that a number of different placements of the individual small dots could be varied along the scan direction which would provide an even better fill or smoother fitting.

Figure 6:
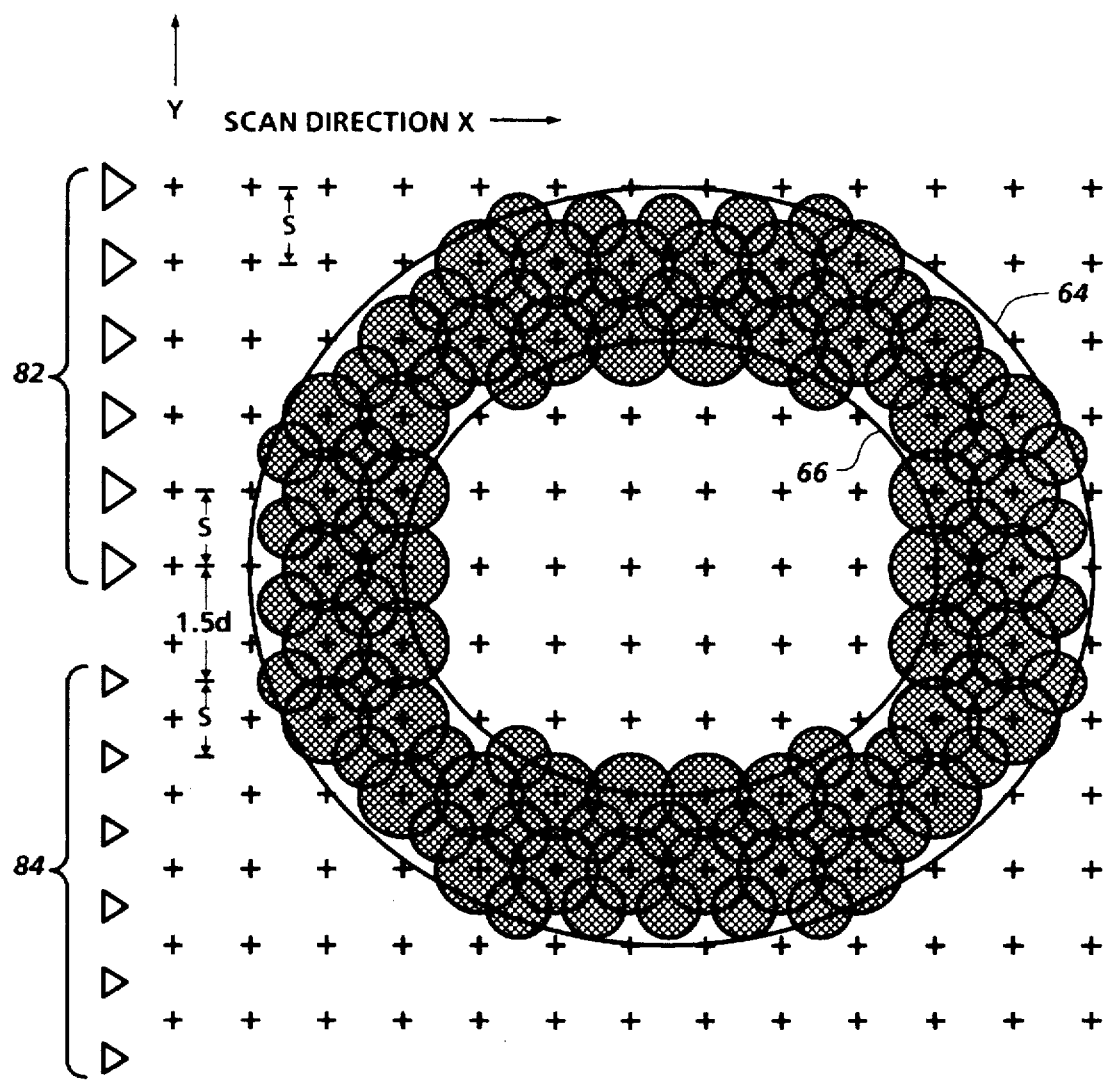
FIG. 6 illustrates the locations of ink drops in a test pattern deposited by ink ejecting nozzles producing offset spots of smaller sizes than in FIG. 5.

In the example of FIG. 5, spot diameters of 1.4s and 1.0s were used. Such spot sizes have ratios of areas of 2 to 1. Other drop generator geometries producing different spot size combinations may, of course, be used. FIG. 6 illustrates a printhead including a first plurality of nozzles 82, which generate a smaller spot diameter than the first plurality of nozzles 70 of FIG. 5, and a second plurality of nozzles 84 which generate a smaller dot size than the second plurality of nozzles 72 of FIG. 5. In the example of FIG. 6, spot diameters of 1.1s and 0.8s are chosen to fill the oval ring defined by the first ellipse 64 and the second ellipse 66. A total of forty-eight of the larger ink drops and fifty-two of the smaller ink drops have been deposited on the sheet to provide a different type of ink fill than presented in FIG. 5. The total amount of ink used in FIG. 6 is just slightly less than in FIG. 5. While the printing scheme according to FIG. 6, appears to provide a smoother fitting fill, the use of such a printhead and printing mechanism could potentially increase the number of times each jet must be fired on average. Consequently, the size of the nozzles chosen for the printhead may be influenced by heater lifetime considerations, as well as the required ink usage, accuracy and appearance of the images to be printed.

Figure 7:
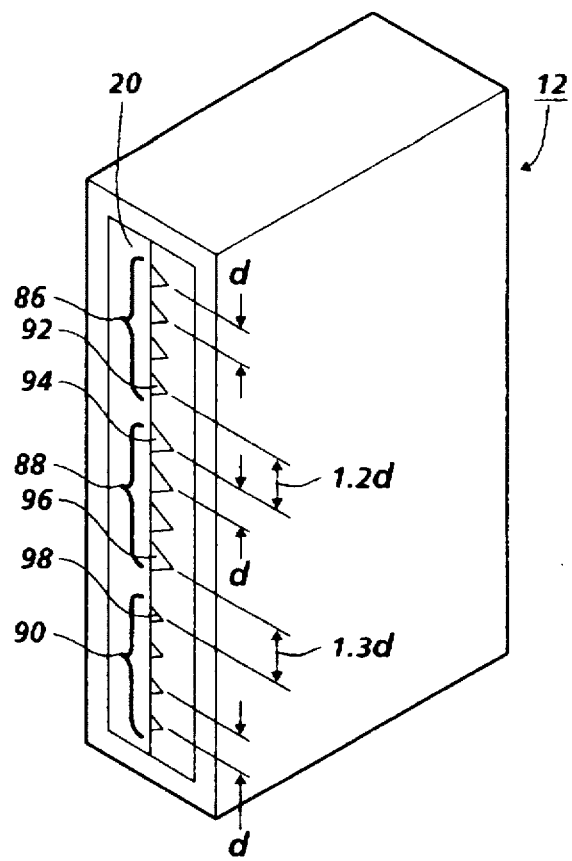
FIG. 7 illustrates an ink jet print cartridge having in ink jet printhead with a first group of ink ejecting nozzles of a first size offset from a second group, or reference group, of ink ejecting nozzles of a second size and a third group of ink ejecting nozzles of a third size offset from the second group.

FIG. 7 illustrates another embodiment of the present invention with the printhead cartridge 12 having the printhead 20 including a first plurality of nozzles 86, a second plurality of nozzles 88, and a third plurality of nozzles 90. In this particular printhead, the nozzles of each of the first, second, and third plurality of nozzles 86, 88, and 90, are each spaced from a respective one of an adjacent nozzle within the plurality of nozzles a distanced. Each of the plurality of nozzles includes nozzles which generate ink spots of a different size. For instance, the second plurality of nozzles 88 generates a spot size of 1.414s. The first plurality of nozzles 86 generates a spot size of 1.0s and the third plurality of nozzles 90 generates a spot size of 0.707s. The areas of such spots are in the ratio of 4 to 2 to 1.

The printhead 20, in addition to having multiple plurality of nozzles, each having different nozzle sizes, includes varying offsets or spacings between adjacent pluralities of nozzles. For instance, an end nozzle 92 of the first plurality of nozzles 86 is spaced a distance of 1.2d from an end nozzle 94 of the second plurality of nozzles 88. Likewise, an end nozzle 96 of the second plurality of nozzles 88 is spaced from an end nozzle 98 of the third plurality of nozzles 90 a distance of 1.3d.

Figure 8:
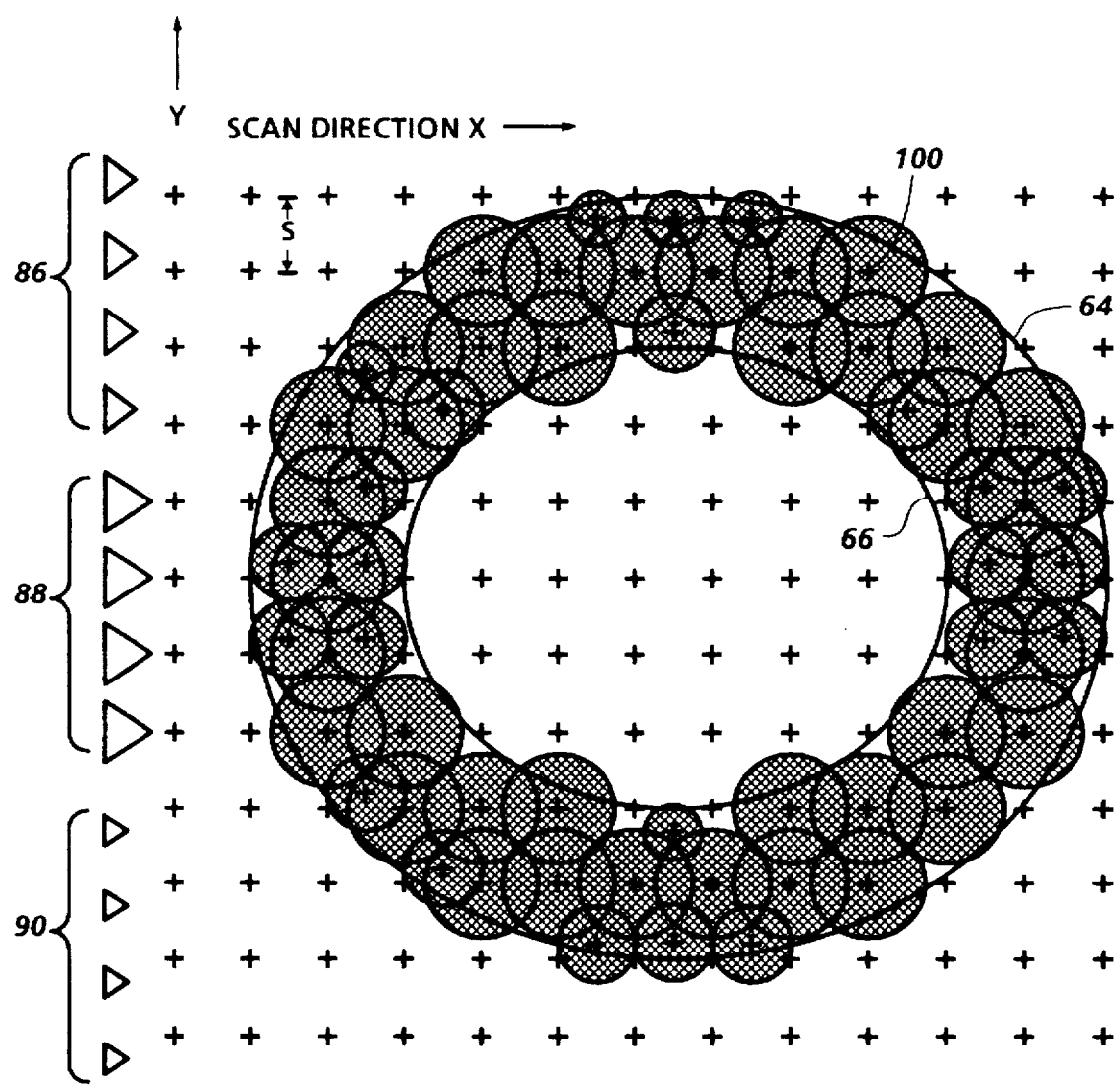
FIG. 8 illustrates the locations of ink drops in a test pattern deposited by the printhead of FIG. 7.

The printhead 12 having three different pluralities of nozzles each having different size nozzles and varying offset distances from adjacent plurality of nozzles is capable of printing images having a smoother appearance than those previously described. For instance, as illustrated in FIG. 8, the central group of nozzles or the second plurality of nozzles 88 which prints ink drops of 1.41s print directly on the grid points 100. This group of nozzles can be considered to be a reference group of nozzles, while the other groups of nozzles are offset therefrom. The first plurality of nozzles 86, due to the spacing of 1.2d from the second plurality of nozzles 88, print on grid points which are displaced along the linear arrays by 0.2s. The third plurality of nozzles 90, due to the offset, are displaced in the opposite sense along the linear arrays by 0.3s. As before, the smaller size spots of the first plurality of nozzles 86 and the third plurality of nozzles 90 are offset from the grid in the scan direction by a total of 0.5s. In this particular embodiment, each plurality of nozzles are sized in one of the three different nozzles size. Since each of the plurality of nozzles is one-third of the total length of the printhead 20, the paper is advanced in increments of one-third of the printhead length and the printing throughput is correspondingly slower than for the case of a printhead having the same total number of nozzles, but only two different sizes. Each of the grid points 100 is then addressable by a 1.41s spot at a grid point. A 1.0s spot is displaced by 0.5s in the scan direction and +0.2s in the array direction and a 0.707 spot is displaced by 0.5s in the scan direction and a −0.3s in the direction of the linear arrays. Many other combinations of offsets and spot sizes are also possible.

An important feature of this particular embodiment is that the Y offsets along the array direction of the two smaller spots of the first plurality of nozzles 86 and the third plurality of nozzles 90 are 0.5s with respect to one another and these offsets from the larger spots of the second plurality of nozzles 88 are not necessarily equal. Consequently, in addition to the wider variety of spot sizes of the printhead 20 of FIG. 7, the availability of differing offsets in the Y direction enables the printhead cartridge 12 of the present invention in combination with the paper advance mechanism of the printer 30, to provide a printer and printing method which improves image resolution.

Figure 9A:
FIGS. 9A and 9B illustrate the respective channel widths and relative locations of different size offset nozzles.
Figure 9B:

The printheads 20 of FIG. 4 and FIG. 7 can be produced according to the teachings of U.S. Pat. No. Re. 32,572 or U.S. Pat. No. 4,774,530, herein incorporated by reference, or by other known methods. Although it would be optimal to design a printhead with all of the transducer elements manufactured to be offset according to the offsets described herein, it is also possible to create a printhead having the heater spacings uniformly spaced and to simply offset the channels and perhaps the polyimide pit layers to provide a printhead having pluralities of printhead nozzles offset as necessary. For example, in a 300 spot per inch printhead the nominal marking transducers spacing is d=84.5 microns and the channel width is sixty-six microns. If channel widths only are changed and heater spacing is allowed to remain the same, the spots which are generated by the first plurality of apertures 86 would require a thirty-six micron channel width where as the smallest spots generated by the third plurality of apertures 90 would require a twenty-four micron channel width. The thirty-six micron channels would be offset by 0.2s or 17 microns in one direction and the twenty-four micron channels would be offset by 0.3s or twenty-five microns in the opposite direction. FIG. 9 shows that these channel sizes and offsets nearly fit within the confines of where a sixty-six micron standard channel would typically be arranged, so that a standard heater plate of uniform heater spacing could be used. FIG. 9A shows a standard channel nozzle 110 and a smaller channel nozzle 112 of thirty-six microns. FIG. 9B shows the standard channel 110 and a standard channel nozzle of a twenty-four micron width 114.

Not only does the present invention improve the resolution of printed images, the present invention also increases the number of gray levels over that of a printhead having printhead nozzles of one size and a printhead having printhead nozzles of two sizes wherein both of these printheads deposit ink spots on pixel centers. To determine the number of gray levels available in ink-jet printers, it is possible to examine area coverages in a 2×2 section of the grid. Initially, the perceived gray level varies depending on how much of the recording medium in the area of a 2×2 section of the grid is covered with ink. In counting the number of different gray levels, the levels which have ink spots or drops in a different configuration are not counted if they have the same area coverage as a previously counted level. In a printhead having a single size nozzle, five levels of gray are possible in the 2×2 area of the grid, such that the 2×2 area of the grid is covered by four ink spots down to a single ink spot wherein two ink spots are either side-by-side in the scanning direction or are organized diagonally, as illustrated in FIGS. 10A to 10E.

For the situation having two spot sizes which are always placed on the grid points, there are 15 additional levels (a total of 20 not counting white), which are generated by placing ink drops of both sizes in all possible configurations. Consequently even though it would take twice as long to print an image with a printhead having two spot sizes at the grid points versus a printhead having a single spot size, the ratio of the number of gray levels to printing speed is higher for the case of two distinct spot sizes.

An even larger number of gray levels, as illustrated in FIGS. 10A through 10AA, is provided by the present invention. Twenty-seven 2×2 unit cells are illustrated. In determining the patterns that give various levels, a 2×2 cell is not considered in isolation because the spots extend between the rectangular cell boundaries and portions of spots from neighboring cells intrude therein. The pattern shown in FIGS. 10A through 10AA are selected such that each pattern gives a unique gray level when white space borders the pattern.

The precise number of unique levels depends on the sizes of the two different spots. For example, if the large spot is greater than or equal to 1.414s, then four spots of this size completely fill the space and additional gray levels of four large spots combined with various numbers of smaller spots is not possible. Similarly, if the small spot is less than 1.0s, then two spots per cell gives the same gray level whether the spots are adjacently located or diagonally located. In the particular example of FIGS. 10A through 10AA having a spot size of 1.4s and a spot size of 1.0s offset at 0.5s, there are 27 different gray levels not counting white.

While it has been shown that the number of gray levels depends on the area coverage and that ink spots generated by nozzles of different sizes provides a greater number of gray levels than possible with ink spots of one size, a second effect of using smaller area spots is that smaller area spots are more efficient in ink usage since the layer of deposited ink is thinner than for large area spots. This has some desirable effects. First of all, by using some proportion of smaller area spots to create images, there will be more pages printable per cartridge of ink. In addition, there may be additional differentiation in gray levels for the case of multiple size spots, since the smaller spots appear less dense per unit of area.

In addition to providing additional numbers of gray levels, the present invention also reduces a visual distortion called contouring. Contouring results from abrupt changes or noticeable differences in gray levels which causes a visual distortion wherein images having contouring do not appear to have smooth transitions from one portion of an image to another portion of an image having different gray levels. The optimal goal is to have smooth variations between gray levels without abrupt changes. The present invention due to its greater number of gray levels, reduces the visual distortion of contouring. Consequently, when a computer or other input device requests a certain gray level, the resulting dot density produced by the present invention more accurately corresponds to the gray level requested by the computer. Noise on the density/level curve is therefore reduced which allows more accurate rendition of printed material.

Additional attributes of the present invention include the application to color printing in which the hues in a color image are extended and smoothed. Likewise the present invention can be used in a draft mode for ink savings. Also by choosing not to print some of the small intermediate spots, such as illustrated in FIGS. 5 and 6, drying times for regions with heavy ink coverage which typically dry either very slowly or not within a required amount of time can be shortened so that ink smearing is avoided. Eliminating some of the smaller spots can also be a way of compensating for larger drop volume at elevated temperature.

Figure 11:
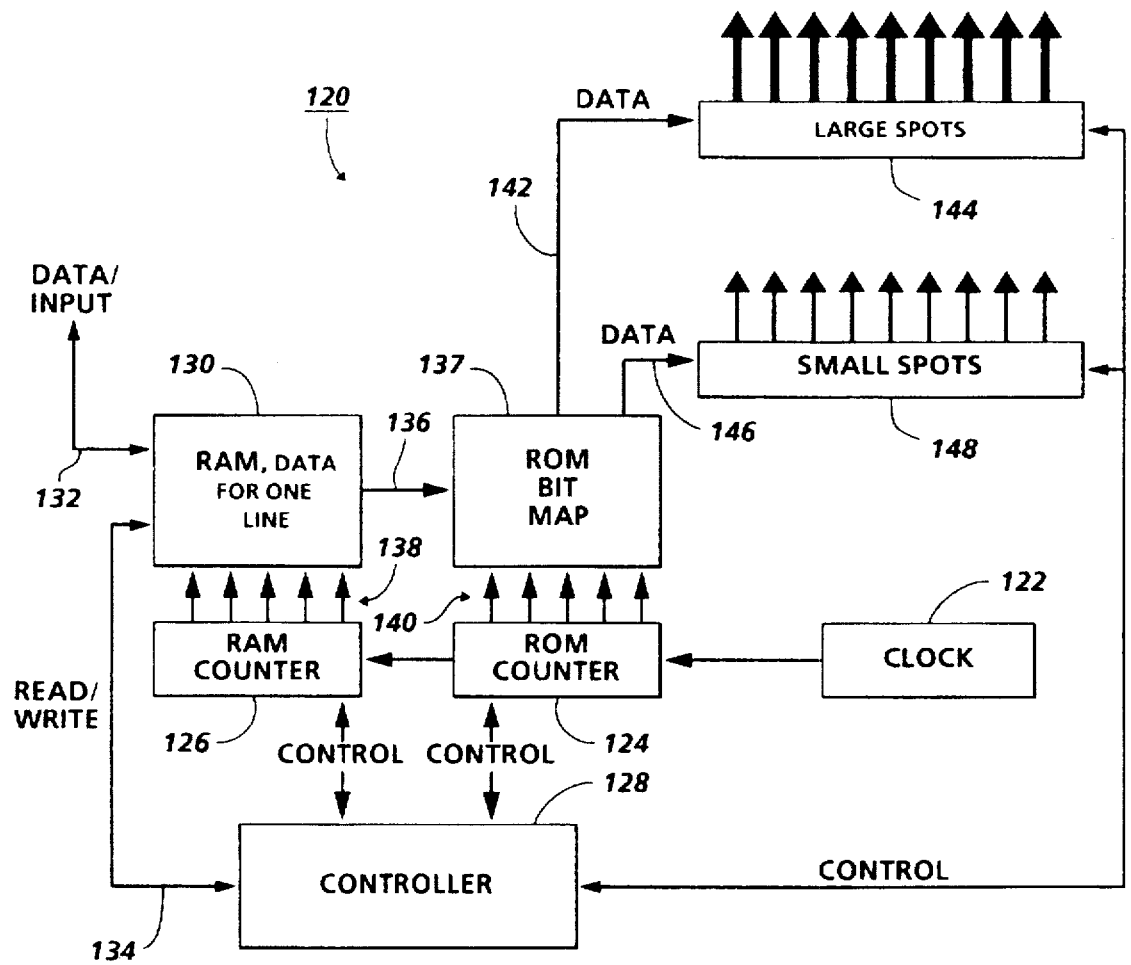
FIG. 11 illustrates a control system of the present invention for printing gray level images with two printheads having different size nozzles.

In image printing where numerous halftones are printed to effect gray scale printing, the burden of generating the specific halftone or dithered pattern should not be performed by the printer controller since such printing tasks reduce the amount of time for the printer controller to perform other operations within the printer. For instance, in the case of alphanumeric printing, the printer controller might call for a letter to be printed using ASCII code and the printer would then generate a bitmap from memory called a character generator. The information concerning the bitmaps for letters may be either stored permanently in the printer read only memory (ROM) or downloaded from a computer into the random access memory (RAM) of the printer. Likewise, when printing an image having gray scale information, the printer controller might call for a specific optical density at a given location in the image. The printer would then supply a suitably selected gray scale pattern to key the two or more sizes of spots necessary for gray scale printing. Since it is desirable for the printer controller to perform tasks other than image manipulation, the present invention includes a control system 120 as illustrated in FIG. 11.

The control system 120 includes a clock 122 having an output connected to a first counter 124. A second counter 126 is serially connected to the first counter 124. The clock 122 generates a sequence of clock pulses which advances the two counters serially connected together. A printer controller 128 controls the first counter 124 and the second counter 126 through separate control lines. In addition, the control system 120, includes a RAM 130 having a data/input line 132 and a read/write input line 134 connected to the controller 128. The RAM 130 receives data or input information from a printer interface which is connected to an image generating system such as a personal computer. The RAM 130 stores image information which can include an entire document, a single line thereof, or a single loading of the printhead. An output line 136 of the RAM 130 is connected to a ROM 137 which contains the bitmapped patterns to be printed. An output line 136 of the RAM 130 is connected to a ROM 137 which contains the bitmapped patterns to be printed. The stored bitmapped patterns may be either alphanumeric characters for printing text, or might include a plurality of halftone cells each representing a different gray level such as illustrated in FIG. 10.

In operation, the clock 122 generates a sequence of clock pulses which advances the first counter 124 which, in turn, advances the second counter 126. The second counter 126 generates a word over a plurality of output lines 138. The word present on the plurality of output lines 138 is applied to the RAM 130 to select a portion of the image to be printed. Typically, the word appearing on the output lines 138 is an address of the data stored in the RAM. The data stored in the RAM could include a number of from one to N where N is equal to the number of different gray levels which can be printed. For instance, the number eight might correspond to the eighth gray level of FIG. 10, FIG. 10H.

The first counter 124 includes a plurality of output lines 140 connected to the ROM 137. The counter 124 selects the particular part of the pattern or halftone cell to be loaded into the printheads based on an output 136 of the RAM 130 which is an address for the ROM 137 containing the bitmapped pattern to be printed. Once the first counter 124 selects the particular portion of the bitmap pattern to be loaded, the ROM 137 outputs the necessary data over a first data line 142 connected to a printhead 144 which prints large spots and a second data line 146 which is connected to a second printhead 148 which prints small spots.

The first printhead 144 might correspond to the linear array of print nozzles 70 in FIG. 4 and the second printhead 148 might correspond to the second linear array of nozzles 72 also illustrated in FIG. 4. The information to each of the printheads 144 and 148 is loaded by a shift register (not shown) resident in each of the printheads. An example of such a shift register and appropriate printhead electronics for use in the present invention is described in U.S. Pat. No. 5,300,968 to Hawkins, herein incorporated by reference. When the loading of the data to a printhead is complete, the information is latched and the individual nozzles eject ink while the next row of data is being loaded into the printhead. It is possible to load several rows of data for each output of the RAM 130. In this way, the printer controller 128 is not burdened with the task of generating the specific bitmap for each density level.

Although ROM 137 may be Read Only Memory with a fixed loaded pattern, it can alternatively be a RAM controlled by Controller 128. In the case that text is being printed, ROM 137 may be downloaded with a character generator for the printing of alphanumerics only. Although 137 can be loaded with the specific bit-mapped patterns shown in FIG. 10, it is found that halftone patterns of a fixed structure for each halftone value often contribute unwanted structure to a printed document. As a result, distortions such as moire patterns may be produced. Therefore, it may be advantageous to alter the structure of the halftone so the equal values of picture density do not always produce the same structured halftone pattern. This could be done, for example, by rotating the fixed patterns of FIG. 10 to different orientations. The orientation may be selected such that the structure of the halftone augments the sharpness of the picture, rather than detracting from it.

Dithering could also be accomplished by downloading different bit maps at the appropriate time. However, dithering tends to smear the picture and introduce distortion. Similarly, any random halftone generation may also introduce a slight blur in the picture. This may be offset by setting the halftone pattern to sharpen the picture rather than softening it. For example, when density increments between pixels are small, randomizing or dithering may be used. When large density jumps are present, the halftone pattern edges should correspond to the picture edges. This sharpening algorithm would, of course, be under operator control, since there are cases where the operator may want to disable the algorithm, for example in the case where picture density corresponds to a measured parameter such as temperature.

Figure 12:
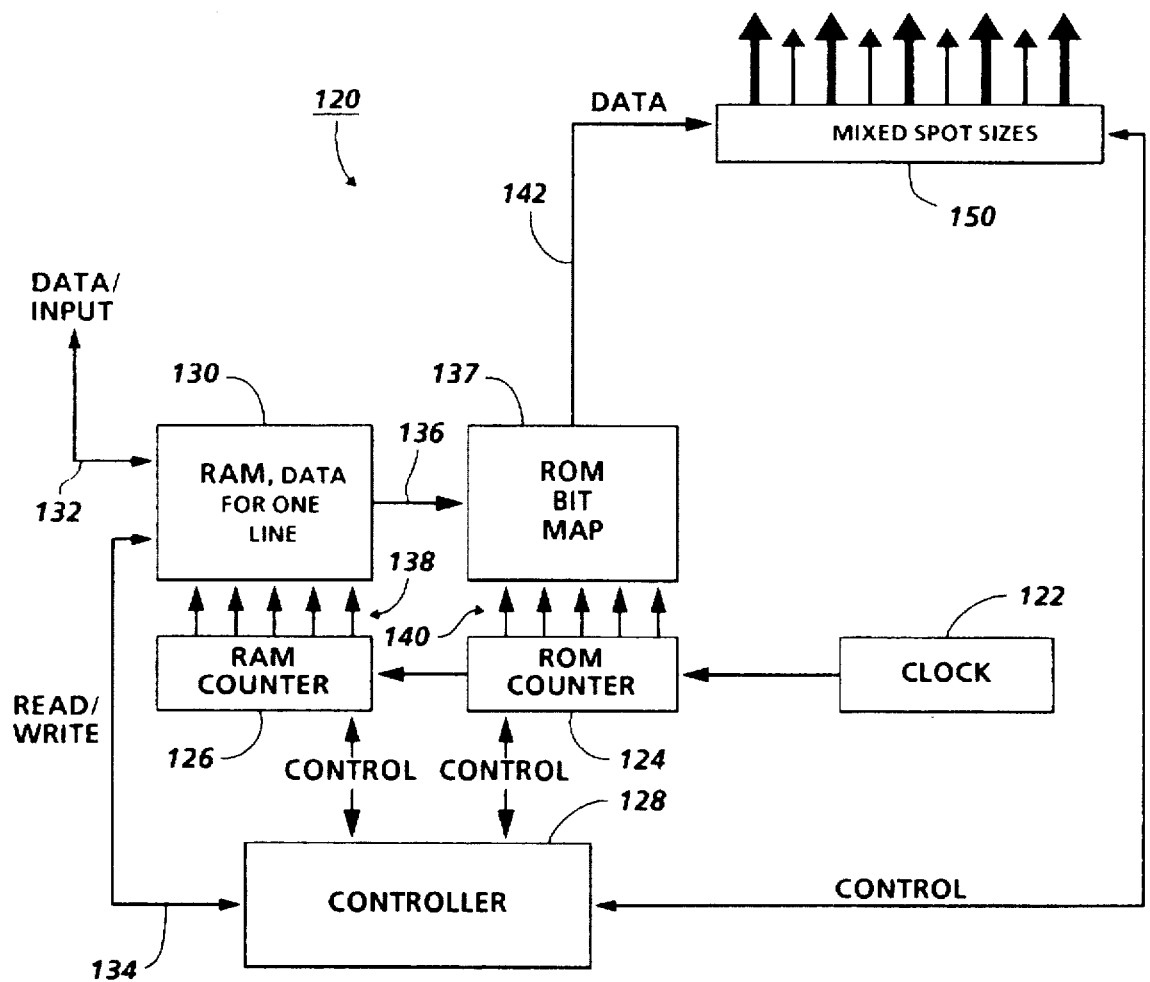
FIG. 12 illustrates a control system of the present invention for printing gray level images with a single printhead having different size nozzles.

While the present invention includes separate printheads each having a different size of nozzles, the present invention also includes printheads having different size nozzles within a single printhead or printhead die as illustrated in FIG. 12. The control system 120 of FIG. 12 includes the same essential elements as that illustrated in FIG. 11, but instead uses a printhead 150 having different sizes of nozzles within a single printhead die.

Figure 13:
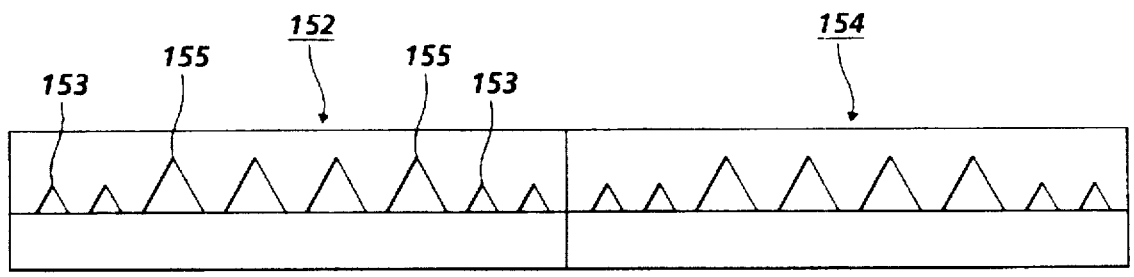
FIG. 13 illustrates a first printhead die butted to a second printhead die, each printhead die having smaller sized nozzles located at the ends of the die, such that nozzles of the same size are adjacent at the butt joint.
Figure 14:
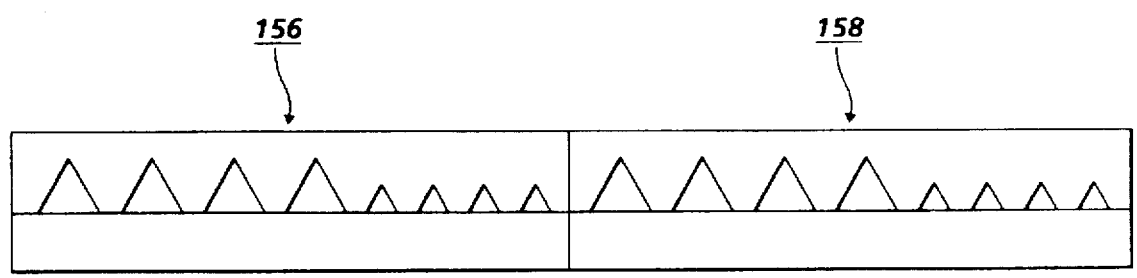
FIG. 14 illustrates a first printhead die butted to a second printhead die, each printhead die having two sizes of nozzles such that nozzles of different sizes are adjacent at the butt joint.

FIG. 13 and FIG. 14 illustrate butted die printheads having two different marking transducer sizes within a single printhead. For instance, in FIG. 13, a first printhead die 152 is butted to a second printhead die 154. The first printhead die 152 and the second printhead die 154 each have narrower channels 153 at each end of the printhead die and wider channels 155 in the center of the die. As an example, eight channels are shown for each die for purposes of illustration, but an actual printhead die may have well over 100 channels. By having a quarter of the channels at each end with the smaller channel geometry, adjacent regions are formed having equal numbers of wide and narrow transducers. By positioning the narrow channels at the butting edges of the printhead die, the end walls of the printhead die can be larger than would be possible with printhead dies having only larger channel sizes. Consequently, there is much more latitude for a robust sealing of the end channel and, therefore, mating of adjacent printhead dies is improved.

An alternative printhead illustrated in FIG. 14 includes a first printhead die 156 and a second printhead die 158. Each of the first printhead die 156 and the second printhead die 158 are identical such that one-half of the channels are contiguous and of one size and the other half of the channels are contiguous and of a second size. This particular configuration is useful in printheads which are comprised of only two butted printhead dies. Such a configuration is more efficient in addressing all the pixels of either spot size without the necessity of additional overscan at the end of the recording medium. In such a configuration for channel die fabrication, it is beneficial to define the ideal dice cut such that it is not half a channel spacing from the center of the end jet, but rather so as to maximize the end channel wall for both wide transducers and narrow transducers. Since the end of the printhead die, which includes the larger channel, has less room for an end wall, it might be necessary to move any critical circuitry, such as driver transducers, away from the narrow transducer end rather than being centered on the transducer, in order to locate the transducer away from the dice cut. Refer to U.S. Pat. No. 5,410,340 to Drake et al., assigned to Xerox Corporation and herein incorporated by reference for additional information in the construction of printhead dies for a printhead.

In recapitulation, a method and apparatus for gray scale printing is described. It is, therefore, apparent that there has been provided in accordance with the present invention, printing of gray scale images in an ink jet printer having a reciprocating carriage printhead. While this invention has been described in conjunction with a specific embodiment thereof, it is evident that many alternatives, modifications, and variations will be apparent to those skilled in the art. For instance, the present invention is not limited to scanning type carriage printers but also includes partial width and page width type printers. Also, while the embodiments discussed have used the example of sideshooter type printheads, the invention may be extended in obvious ways to the use of roofshooter type printheads in which the nozzles may be arranged in two-dimensional arrays. For instance, a first bank of two or more linear arrays arranged substantially parallel with respect to one another, i.e. a two-dimensional array, produces spots of a first size and a second bank of two or more linear arrays, arranged substantially parallel with respect to one another, produce spots of a second size. The nozzles of adjacent substantially parallel linear arrays of a single bank of nozzles are collinear, such that adjacent nozzles of parallel linear arrays deposit ink drops along the same scan line or grid line. The first bank is offset from the second bank as previously described for the present invention. Accordingly, it is intended to embrace all such alternatives, modifications and variations that fall within the spirit and broad scope of the appended claims.

What is claimed is:

1. A printing machine of the type in which liquid ink is deposited on a recording medium, comprising:

a printhead including a first linear array of first ejectors, said first ejectors being spaced by a predetermined pitch, for depositing ink spots of a first size on the recording medium, a second linear array of second ejectors, said second ejectors being spaced by the predetermined pitch, for depositing ink spots of a second size on the recording medium, and a third linear array of third ejectors depositing ink spots of a third size, said third linear array aligned substantially parallel with respect to said first linear array said second linear array offset an offset distance from said first linear array in the linear direction, the offset distance being substantially equivalent to an integer multiple of the predetermined pitch plus a partial amount of the predetermined pitch, said third linear array spaced from said second linear array by a second offset distance, the second offset distance being substantially equivalent to an integer multiple of the predetermined pitch plus a second partial amount of the predetermined pitch, the second partial amount of the predetermined pitch being different than the first mentioned partial amount; and means for moving said printhead in a direction transverse to said first linear array.

2. The printing machine of claim 1, wherein said first linear array and said second linear array are collinear.

3. The printing machine of claim 1, further comprising a controller for controlling said moving means to enable said first linear array to deposit ink drops at first locations in the direction transverse to said first linear array and to enable said second linear array to deposit ink drops at second locations located at intermediate points in the direction transverse to said first linear array on the recording medium.

4. The printing machine of claim 3, wherein the intermediate points are spaced from the first locations a distance, in the direction transverse to said first linear array, substantially equivalent to a partial amount of the predetermined pitch.

5. The printing machine of claim 1, wherein the first mention offset distance includes a distance substantially equivalent to the integer multiple of the predetermined pitch plus approximately 0.3 times the predetermined pitch.

6. The printing machine of claim 5, wherein the second offset distance substantially equivalent to the integer multiple of the predetermined pitch plus approximately 0.2 times the predetermined pitch.

7. A printing machine of the type in which liquid ink is deposited on a recording medium, comprising:

a printhead, including a plurality of adjacent linear arrays, including a first linear array, a second linear array, and a third linear array, each of said plurality of adjacent linear arrays including a plurality of drop ejectors being spaced at a predetermined pitch and ejecting ink drops of a size different than the ink drops ejected by an adjacent one of said plurality of adjacent linear arrays, each of said plurality of adjacent linear arrays being spaced from an adjacent one of said adjacent linear arrays an offset distance in the linear direction, the offset distance being substantially equivalent to an integer multiple of the predetermined pitch plus a partial amount of the predetermined pitch, the partial amount of the predetermined pitch between said first linear array and said second linear array being substantially equal to 0.3 times the predetermined pitch and the partial amount of the predetermined pitch between said second linear array and said third linear array being substantially equal to 0.2 times the predetermined pitch;

a stepping mechanism, advancing the recording medium past the printhead in steps, the length of a step being determined as a function of the number of said plurality of adjacent linear arrays; and a carriage, for moving said printhead in a direction transverse to said plurality of linear arrays across said recording medium.

8. The printing machine of claim 7, wherein the length of the step is approximately equivalent to the reciprocal of the number of said plurality of adjacent linear arrays.

* * * * *